US012744135B2

(12) United States Patent
Rhyee et al.

(10) Patent No.: US 12,744,135 B2
(45) Date of Patent: Sep. 22, 2026

(54) METHOD FOR PRODUCING HIGH-ENTROPY ALLOY SUPERCONDUCTOR BULK MATERIALS AND WIRE MATERIALS, BULK HIGH-ENTROPY ALLOY SUPERCONDUCTOR PRODUCED USING THE METHOD, AND METHOD FOR PRODUCING THIN-FILM HIGH-ENTROPY ALLOY SUPERCONDUCTOR USING THE SAME

(71) Applicants: RESEARCH & BUSINESS FOUNDATION SUNGKYUNKWAN UNIVERSITY, Suwon-si (KR); University-Industry Cooperation Group of Kyung Hee University, Yongin-si (KR)

(72) Inventors: Jong-Soo Rhyee, Yongin-si (KR); Jin Hee Kim, Yongin-si (KR); Tuson Park, Suwon-si (KR); Soon-Gil Jung, Suwon-si (KR); Yoonseok Han, Suwon-si (KR); Won Nam Kang, Suwon-si (KR); Woo Seok Choi, Suwon-si (KR)

(73) Assignees: RESEARCH & BUSINESS FOUNDATION SUNGKYUN UNIVERSITY, Suwon-si (KR); UNIVERSITY INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 893 days.

(21) Appl. No.: 18/073,954

(22) Filed: Dec. 2, 2022

(65) Prior Publication Data

US 2023/0178269 A1 Jun. 8, 2023

(30) Foreign Application Priority Data

Dec. 2, 2021 (KR) ........................ 10-2021-0170705

(51) Int. Cl.
*H01B 12/02* (2006.01)
*C22C 1/04* (2023.01)
*C22C 27/02* (2006.01)

(52) U.S. Cl.
CPC ............. *H01B 12/02* (2013.01); *C22C 1/045* (2013.01); *C22C 27/02* (2013.01)

(58) Field of Classification Search
None
See application file for complete search history.

(56) References Cited

FOREIGN PATENT DOCUMENTS

| | | | |
|---|---|---|---|
| JP | 2013-163847 | A | 8/2013 |
| KR | 10-1998-0031989 | A | 7/1998 |

OTHER PUBLICATIONS

Shkodich, Natalia, et al. "Refractory High-Entropy HfTaTiNbZr-Based Alloys by Combined Use of Ball Milling and Spark Plasma Sintering: Effect of Milling Intensity." Metals 10.9 (2020) 1268 (Year: 2020).*

(Continued)

*Primary Examiner* — Alexandra M Moore
(74) *Attorney, Agent, or Firm* — LEX IP MEISTER, PLLC

(57) ABSTRACT

Disclosed is a method for producing a high-entropy alloy superconductor bulk materials and wire materials, the method including a first step of mixing 4 to 10 types of metals selected from a group consisting of niobium (Nb), tantalum (Ta), titanium (Ti), hafnium (Hf), zirconium (Zr), tungsten (W), molybdenum (Mo), chromium (Cr), vanadium (V), and rhenium (Re) with each other to prepare a mixture and then milling the mixture to prepare mixed metal pow- (Continued)

ders; and a second step of sintering the mixed metal powders prepared in the first step.

7 Claims, 11 Drawing Sheets

(56) References Cited

OTHER PUBLICATIONS

Von Rohr, Fabian, et al. "Effect of electron count and chemical complexity in the Ta—Nb—Hf—Zr—Ti high-entropy alloy superconductor." Proceedings of the National Academy of Sciences 113.46 (2016): E7144-E7150., (7 pages).
Shkodich, Natalia, et al. "Refractory High-Entropy HfTaTiNbZr-Based Alloys by Combined Use of Ball Milling and Spark Plasma Sintering: Effect of Milling Intensity." Metals 10.9 (2020): 1268., (15 pages).
Von Rohr, Fabian, et al. "Effect of electron count and chemical complexity in the Ta—Nb—Hf—Zr—Ti high-entropy alloy superconductor." Proceedings of the National Academy of Sciences 113.46 (2016): E7144-E7150, (7 pages in English).
Shkodich, Natalia, et al. "Refractory High-Entropy HfTaTiNbZr-Based Alloys by Combined Use of Ball Milling and Spark Plasma Sintering: Effect of Milling Intensity." Metals 10.9 (2020): 1268, (15 pages in English).
Korean Office Action issued on Feb. 23, 2023, in counterpart Korean Patent Application No. 10-2021-0170705 (7 pages in Korean).

* cited by examiner

METHOD FOR PRODUCING HIGH-ENTROPY ALLOY SUPERCONDUCTOR BULK MATERIALS AND WIRE MATERIALS, BULK HIGH-ENTROPY ALLOY SUPERCONDUCTOR PRODUCED USING THE METHOD, AND METHOD FOR PRODUCING THIN-FILM HIGH-ENTROPY ALLOY SUPERCONDUCTOR USING THE SAME

CROSS-REFERENCE TO RELATED APPLICATIONS

This application claims priority from Korean Patent Application No. 10-2021-0170705 filed on Dec. 2, 2021, in the Korean Intellectual Property Office, and all the benefits accruing therefrom under 35 U.S.C. 119, the contents of which in its entirety are herein incorporated by reference.

BACKGROUND

Field

The present disclosure relates to a method for producing a high-entropy alloy superconductor bulk materials and wire materials, a high-entropy alloy superconductor bulk materials and wire materials produced using the method, and a method for producing a thin-film high-entropy alloy superconductor using the high-entropy alloy superconductor bulk materials.

Description of Related Art

A superconductor is a material with zero electrical resistance and thus can transmit large current without loss of power. Thus, the superconductor may be used in numerous industrial, medical, and scientific research fields including not only generators, motors, power cables, and energy storage devices, but also nuclear fusion devices, magnetic levitation trains, particle accelerators, MRI, NMR, etc. that require high magnetic fields.

A high-entropy alloy has high strength, high ductility, and excellent fracture toughness, and may be used in extreme environments such as high pressure, high temperature and low temperature. In addition, the high-entropy alloy has superconductivity. Thus, studies have been conducted to utilize the high-entropy alloy. One of the important superconducting properties thereof is a critical current density. However, studies on a high-entropy alloy superconductor with a significant critical current density are currently lacking. Therefore, development of a high-entropy alloy superconductor with the significant critical current density is required.

A conventional method for producing a bulk high-entropy alloy superconductor uses arc melting. It is difficult to mass-produce the bulk high-entropy alloy superconductor using the arc melting due to the nature of a process thereof. Therefore, a new process for mass-producing the high-entropy alloy superconductor with excellent superconducting properties is required. Also, a new process for producing high-entropy alloy superconductor wire materials with improved superconducting feature for utilizing high-entropy alloy superconductor is required.

In particular, studies on a thin-film high-entropy alloy superconductor are lacking. A superconductor has two properties: a perfect conductor and a perfect diamagnetism.

When these two properties are satisfied, excellent superconducting properties may be achieved. However, a critical current density value and perfect diamagnetic properties have not been reported in the thin-film high-entropy alloy superconductor. Since an application of a superconductor thin-film as a superconducting wire in a form of a tape and a device in electronic equipment is promising, a method for producing a thin-film high-entropy alloy superconductor with excellent superconducting properties is required.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a method for producing a high-entropy alloy superconductor bulk materials and wire materials capable of producing a high-entropy alloy superconductor in large quantities.

Another purpose of the present disclosure is to provide a high-entropy alloy superconductor bulk materials and wire materials having excellent superconducting properties produced using the method for producing the high-entropy alloy superconductor bulk materials and wire materials.

Still another purpose of the present disclosure is to provide a method of producing a thin-film high-entropy alloy superconductor having excellent superconductivity using the high-entropy alloy superconductor bulk materials.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

A first aspect of the present disclosure provides a method for producing a high-entropy alloy superconductor bulk materials and wire materials, the method comprising: a first step of mixing 4 to 10 types of metals selected from a group consisting of niobium (Nb), tantalum (Ta), titanium (Ti), hafnium (Hf), zirconium (Zr), tungsten (W), molybdenum (Mo), chromium (Cr), vanadium (V), and rhenium (Re) with each other to prepare a mixture and then milling the mixture to prepare mixed metal powders according to a following Chemical Formula I; and a second step of sintering the mixed metal powders prepared in the first step:

[Chemical Formula I]

$$(M_1)_{x1}(M_2)_{x2}(M_3)_{x3} \ldots (M_n)_{xn}$$

where n is an integer from 4 to 10, $M_1$ to $M_n$ respectively represent the 4 to 10 types of the metals selected from the group consisting of niobium (Nb), tantalum (Ta), titanium (Ti), hafnium (Hf), zirconium (Zr), tungsten (W), molybdenum (Mo), chromium (Cr), vanadium (V), and rhenium (Re), each of $x_1$ to $x_n$ is an integer greater than or equal to 1, and has a value of 5% to 35% of a total of $x_1$ to $x_n$.

The method for producing the high-entropy alloy superconductor bulk materials and wire materials according to an embodiment of the present disclosure including the above steps may provide a mass production method of a high-entropy alloy superconductor.

In one implementation of the first aspect, the 4 to 10 types of the metals in the first step include niobium (Nb), tantalum (Ta), titanium (Ti), hafnium (Hf) and zirconium (Zr), wherein the alloy produced in the second step has a following Chemical Formula II:

[Chemical Formula II]

$$(Nb)_{y1}(Ta)_{y2}(Ti)_{y3}(Hf)_{y4}(Zr)_{y5}$$

where each of $y_1$ to $y_5$ is an integer greater than or equal to 1, and has a value of 5% to 35% of a total of $y_1$ to $y_5$.

In one implementation of the first aspect, $y_1$ is 2, $y_2$ is 1, $y_3$ is 1, $y_4$ is 1, and $y_5$ is 1, Based on the limitations the types and the contents of the metals as described above, the high-entropy alloy superconductor bulk materials and wire materials produced by the method according to an embodiment of the present disclosure may have excellent superconducting properties.

In one implementation of the first aspect, the milling in the first step includes ball milling.

In one implementation of the first aspect, the ball milling is performed for about 9 to 24 hours at about 200 to 600 RPM.

The first step of the method for producing the high-entropy alloy superconductor bulk materials and wire materials according to the embodiment of the present disclosure including the ball milling process as described above is suitable for mass production of the bulk high-entropy alloy superconductor.

In one implementation of the first aspect, the ball milling is performed under an argon gas atmosphere.

Oxidation of the metal may be prevented in the ball milling process under the argon gas atmosphere.

In one implementation of the first aspect, in case of high-entropy alloy superconductor bulk materials, the sintering in the second step includes placing the mixed metal powders in a mold and then pressing and heating the mixed metal powders in the mold.

Via the sintering using the mold as described above, the bulk high-entropy alloy superconductor produced by the method according to an embodiment of the present disclosure may be shaped into a desired shape.

In one implementation of the first aspect, the mold includes a carbon mold.

Using the carbon mold may allow a reaction between the mold and the metal to be minimized.

In one implementation of the first aspect, the pressing includes pressing the mixed metal powders at about 5 to 500 MPa, wherein the heating includes heating the mixed metal powders at about 500 to 1300° C., wherein the pressing and heating is performed for about 5 minutes to 2 hours.

The bulk high-entropy alloy superconductor according to an embodiment of the present disclosure is sintered via the pressing and heating process as described above.

A second aspect of the present disclosure provides a bulk high-entropy alloy superconductor produced using the method for producing the bulk high-entropy alloy superconductor as described above.

In one implementation of the second aspect, the bulk high-entropy alloy superconductor has a disk-shape or a cylindrical shape, wherein the bulk high-entropy alloy superconductor has a diameter of about 3 to 50 mm and a thickness of about 1 to 30 mm.

The bulk high-entropy alloy superconductor having the above shape may be applied to various technologies including a method for producing a thin-film high-entropy alloy superconductor to be described below.

In case of high-entropy alloy superconductor wire materials, the sintering in the second step includes the mixed metal power is filled in metal tube and heating after drawing to long wire with powder-in-tube (PIT) process.

Through sintering after drawing to long wire with PIT process as said, the high-entropy alloy superconductor wire materials according to the embodiment of the invention may have superconducting features and be made in wire shape.

The metal tube can include iron, stainless steel and/or copper.

The wire materials may be acquired using the metal tube including iron, stainless steel and/or copper.

The heating may be performed at about 500 to 1100° C., for about 30 minutes to 12 hours.

The high-entropy alloy superconducting wire materials according to an embodiment of the present disclosure may be sintered by the heating process.

In another aspect, the present invention provides high-entropy alloy superconducting long wire materials made by the method for producing high-entropy alloy superconducting wire materials.

Said high-entropy superconducting long wire materials are in shape of long wire, which has diameters less than 1 mm and length of about tens to hundreds of meters.

A third aspect of the present disclosure provides a method for producing a thin-film high-entropy alloy superconductor, the method comprising: a first step of providing, as a target, a bulk high-entropy alloy superconductor produced using the method for producing the bulk high-entropy alloy superconductor as described above; and a second step of evaporating the target such that the evaporated target is deposited on a substrate to form a thin-film alloy on the substrate.

The thin-film high-entropy alloy superconductor produced by the method for producing the thin-film high-entropy alloy superconductor according to an embodiment of the present disclosure including the above steps has superconducting properties of the bulk high-entropy alloy superconductor, and may be produced as a thin-film.

In one implementation of the third aspect, the target includes niobium (Nb), tantalum (Ta), titanium (Ti), hafnium (Hf) and zirconium (Zr), and has a following Chemical Formula III:

[Chemical Formula III]

$$(Nb)_{z1}(Ta)_{z2}(Ti)_{z3}(Hf)_{z4}(Zr)_{z5}$$

where each of $z_1$ to zs is an integer greater than or equal to 1, and has a value of 5% to 35% of a total of $z_1$ to $z_5$.

In one implementation of the third aspect, $z_1$ is 2, $z_2$ is 1, 73 is 1, $z_4$ is 1, and $z_5$ is 1.

Based on the limitations of the types and the contents of the metals as described above, the thin-film high-entropy alloy superconductor according to an embodiment of the present disclosure may have excellent superconducting properties.

In one implementation of the third aspect, the target is evaporated via irradiation of laser thereto.

In one implementation of the third aspect, the laser includes excimer pulse laser.

In one implementation of the third aspect, the excimer pulse laser has a wavelength of 193 to 532 nm.

In one implementation of the third aspect, the target is evaporated while the target is rotating.

A thickness of a finally formed thin-film high-entropy alloy superconductor may be adjusted by controlling an energy density and the number of pulse waves of the laser according to the target evaporation scheme as descried above.

In one implementation of the third aspect, the substrate includes a sapphire ($Al_2O_3$) single crystal or Hastelloy substrate.

The selection of the substrate as described above has the advantage that a cost of the process may be reduced, and a material used in an existing process may be used as it is.

In one implementation of the third aspect, the substrate is heated at 270 to 620° C.

Due to the process of heating the substrate as described above, excellent superconducting properties may be maintained during the deposition process.

In one implementation of the third aspect, the substrate is heated with a halogen lamp.

Using the halogen lamp as described above may achieve rapid heating and rapid cooling.

In one implementation of the third aspect, the second step is carried out in a vacuum of about 10-7 to 10-5 Torr.

The above vacuum state prevents oxidation of the metal while the thin-film is deposited on the substrate.

In one implementation of the third aspect, a thickness of the thin-film alloy is in a range of about 100 to 700 nm.

As described above, the method for producing the high-entropy alloy superconductor bulk materials and wire materials according to an embodiment of the present disclosure may provide a method for mass production of the high-entropy alloy superconductor.

The high-entropy alloy superconductor bulk materials and wire materials produced by the method for producing the high-entropy alloy superconductor bulk materials and wire materials may have excellent superconducting properties.

The method for producing the thin-film high-entropy alloy superconductor using the high-entropy alloy superconductor bulk materials provides a method capable of processing the high-entropy alloy superconductor bulk materials into the thin-film high-entropy alloy superconductor while maintaining excellent superconducting properties of the high-entropy alloy superconductor bulk materials.

In addition to the effects as described above, specific effects in accordance with the present disclosure will be described together with following detailed descriptions for carrying out the disclosure.

DETAILED DESCRIPTIONS

Figure 1:
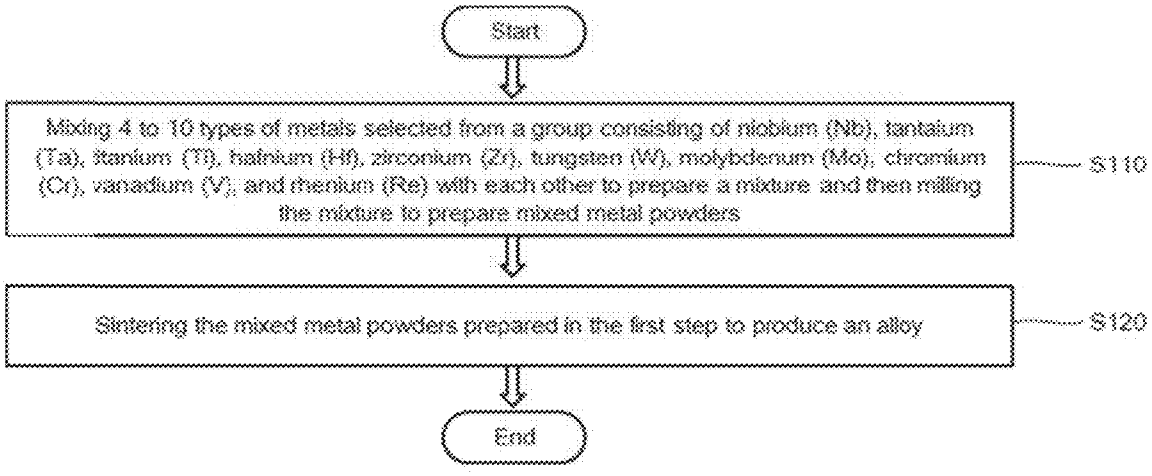
FIG. 1 is a flowchart showing a method for producing a bulk high-entropy alloy superconductor according to an embodiment of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, and components have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify an entirety of list of elements and may not modify the individual elements of the list. When referring to "C to D", this means C inclusive to D inclusive unless otherwise specified.

It will be understood that, although the terms "first", "second", "third", and so on may be used herein to illustrate various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "substantially," "about," and similar terms are used as terms of approximation and not as terms of degree, and are intended to account for the inherent deviations in measured or calculated values that would be recognized by those of ordinary skill in the art. The term may be used to prevent unauthorized exploitation by an unauthorized infringer to design around accurate or absolute figures provided to help understand the present disclosure.

FIG. 1 is a flowchart showing a method for producing a bulk high-entropy alloy superconductor according to an embodiment of the present disclosure.

Referring to FIG. 1, a method for producing a bulk high-entropy alloy superconductor according to an embodiment of the present disclosure includes a first step S110 of mixing 4 to 10 types of metals selected from a group consisting of niobium (Nb), tantalum (Ta), titanium (Ti), hafnium (Hf), zirconium (Zr), tungsten (W), molybdenum (Mo), chromium (Cr), vanadium (V), and rhenium (Re) with each other to prepare a mixture and then milling the mixture to prepare mixed metal powders according to a following Chemical Formula I; and a second step S120 of sintering the mixed metal powders prepared in the first step:

[Chemical Formula I]

$$(M_1)_{x1}(M_2)_{x2}(M_3)_{x3} \ldots (M_n)_{xn}$$

where n is an integer from 4 to 10, $M_1$ to $M_n$ respectively represent the 4 to 10 types of the metals selected from the group consisting of niobium (Nb), tantalum (Ta), titanium (Ti), hafnium (Hf), zirconium (Zr), tungsten (W), molybdenum (Mo), chromium (Cr), vanadium (V), and rhenium (Re), each of $x_1$ to $x_n$ is an integer greater than or equal to 1, and has a value of 5% to 35% of a total of $x_1$ to $x_n$.

The method for producing the bulk high-entropy alloy superconductor according to an embodiment of the present disclosure including the above steps may provide a mass production method of a high-entropy alloy superconductor.

In one embodiment, the 4 to 10 types of the metals in the first step S110 include niobium (Nb), tantalum (Ta), titanium (Ti), hafnium (Hf) and zirconium (Zr), wherein the alloy produced in the second step has a following Chemical Formula II:

[Chemical Formula II]

$$(Nb)_{y1}(Ta)_{y2}(Ti)_{y3}(Hf)_{y4}(Zr)_{y5}$$

where each of $y_1$ to $y_5$ is an integer greater than or equal to 1, and has a value of 5% to 35% of a total of $y_1$ to $y_5$.

In one embodiment, a molar ratio of Nb:Ta:Ti:Hf:Zr may be 2:1:1:1:1. That is, $y_1$ is 2, $y_2$ is 1, $y_3$ is 1, $y_4$ is 1, and $y_5$ is 1.

Based on the limitations the types and the contents of the metals as described above, the bulk high-entropy alloy superconductor produced by the method according to an embodiment of the present disclosure may have excellent superconducting properties.

The first step S110 is a step of mixing the metals with each other to prepare the mixture and milling the mixture. In the first step S110, the metals are mixed with each other to achieve high entropy before sintering the mixture into an alloy.

In the context of the present disclosure, the milling is meant to include any process of processing particles of a material including the metal into particles of a smaller size. A non-limiting example thereof includes ball milling. In an embodiment, the milling in the first step S110 may include the ball milling.

Figure 2:
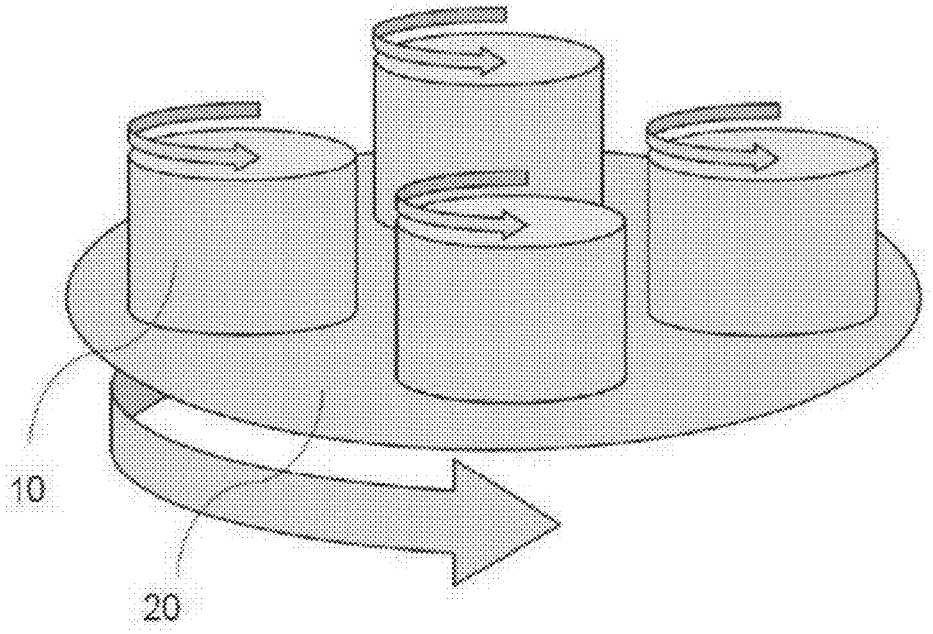
FIGS. 2 to 4 are diagrams showing apparatuses for implementing a method for producing a bulk high-entropy alloy superconductor according to an embodiment of the present disclosure.
Figure 3:
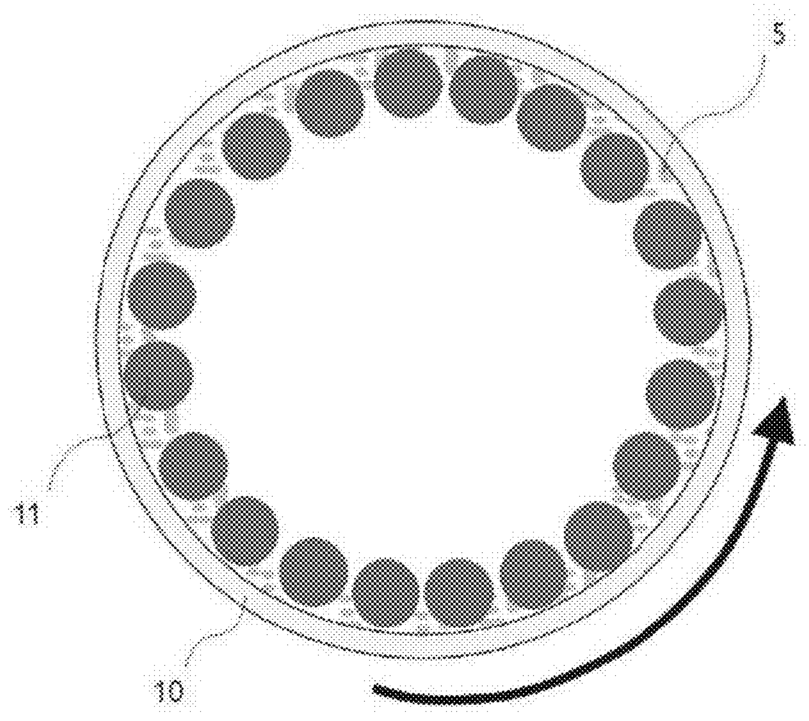

FIGS. 2 and 3 are diagrams showing non-limiting examples of an apparatus capable of implementing the ball milling according to an embodiment in which the milling in the first step S110 is embodied as the ball milling.

FIG. 2 is a view showing a ball milling apparatus. Referring to FIG. 2, the ball milling process may be performed in a milling container 10. The milling container 10 may be disposed on a rotatable plate 20 and can rotate.

FIG. 3 is a view showing the milling container 10. Referring to FIG. 3, metal balls 11 may be received in the milling container 10, and metal powders 5 may be received therein. In the milling container 10, the metal balls 11 may mill the metal powders 5 using a frictional force therebetween resulting from a rotational force applied from the rotatable plate 20.

In one embodiment, the ball milling may be performed at about 200 to 600 RPM for about 9 to 24 hours. For example, the ball milling may be performed at about 400 RPM for about 12 hours.

The first step S110 of the method for producing the bulk high-entropy alloy superconductor according to the embodiment of the present disclosure including the ball milling process as described above is suitable for mass production of the bulk high-entropy alloy superconductor.

In order to prevent oxidation of the metal powders while the ball milling is in progress, the ball milling may be carried out under a gas atmosphere with low reactivity therewith. In an embodiment, the ball milling may be performed under an argon gas atmosphere.

The second step S120 is a step of sintering the milled mixed metal powders. In the second step S120, the metal powders are sintered into an alloy.

Figure 4:
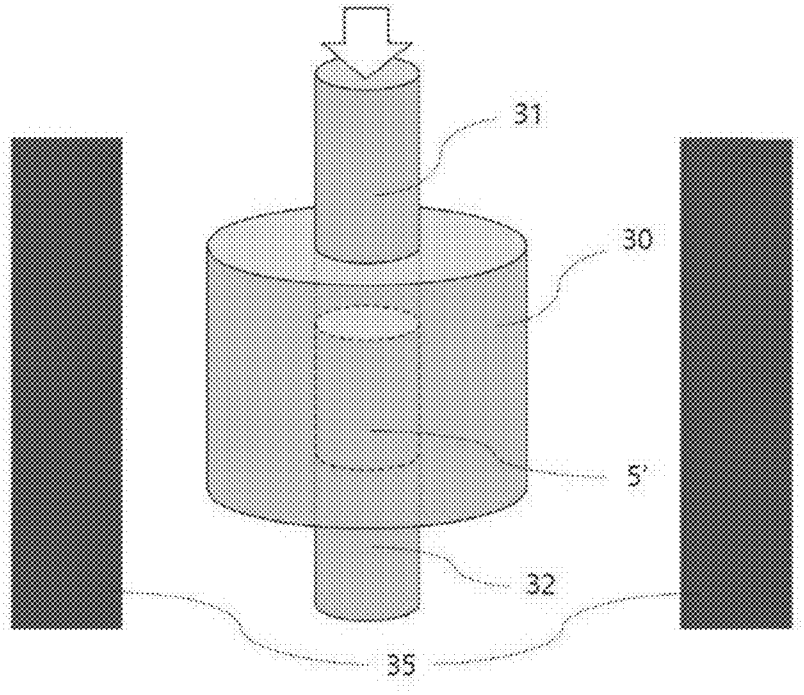

FIG. 4 is a view showing a non-limiting example of an apparatus capable of implementing the sintering process of the second step S120.

Referring to FIG. 4, the sintering of the second step S120 may include placing the mixed metal powders 5' in a mold 30, and pressing and heating the mixed metal powders 5' in the mold 30. The pressing process may be performed by an upper punch 31 and a lower punch 32 of the mold 30. The heating process may be performed using a mold heater 35.

Via the sintering using the mold as described above, the bulk high-entropy alloy superconductor produced by the method according to an embodiment of the present disclosure may be shaped into a desired shape.

The mold 30 may include a less reactive material in order to minimize a reaction thereof with the mixed metal powders 5' during the sintering process. In one embodiment, the mold 30 may include a carbon mold.

In one embodiment, the pressing includes pressing the mixed metal powders at about 5 to 500 MPa, wherein the heating includes heating the mixed metal powders at about 500 to 1300° C., wherein the pressing and heating is performed for about 5 minutes to 2 hours. For example, the pressing process may be performed at 50 MPa, the heating process may be performed at 900° C., and the pressing and heating may be performed for 1 hour.

The bulk high-entropy alloy superconductor according to an embodiment of the present disclosure is sintered via the pressing and heating process as described above.

Another aspect of the present disclosure provides a bulk high-entropy alloy superconductor produced using the method for producing the bulk high-entropy alloy superconductor as described above.

As described above, in the method for producing the bulk high-entropy alloy superconductor according to an embodiment of the present disclosure, the shape of the produced bulk high-entropy alloy superconductor may be formed during the sintering using the mold. Therefore, the shape of the bulk high-entropy alloy superconductor is not particularly limited. In one embodiment, the bulk high-entropy alloy superconductor may have a disk shape or a cylindrical shape. For example, the bulk high-entropy alloy superconductor may have a disk shape or a cylindrical shape, and may have a diameter of 3 to 50 mm and a thickness of 1 to 30 mm.

Figure 5:
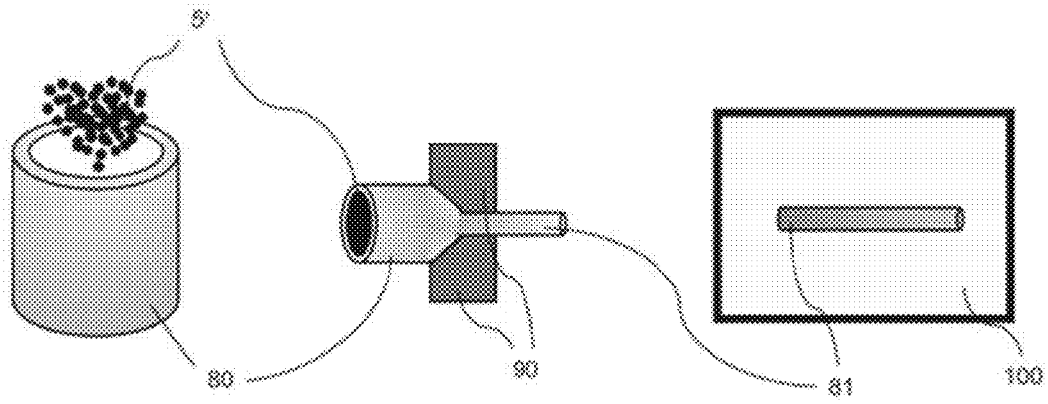
FIG. 5 is a view showing an apparatus for implementing a method for producing a wire high-entropy alloy superconductor according to an embodiment of the present disclosure.

FIG. 5 is a view showing an apparatus for implementing a method for producing a wire high-entropy alloy superconductor, which is a non-limiting example of an apparatus for implementing said PIT (Powder-In-Tube) process and sintering process of the high-entropy metal alloy powder acquired by the first step S110.

Referring to FIG. 5, through PIT process, thin wire 81 may be mad from metal tube filled with said mixed metal powder 5' using wire drawing 90. For example, 1-mm diameter long wire can be made by repeating the wire drawing with 4-mm diameter metal tube filled with the meatal powder.

In one embodiment, deploying the wire 81 made through said PIT process in an electric furnace and then heating may be included in the method. In one example, the heating process may be performed at about 500 to 1100° C. for about 30 minutes to 12 hours. For example, said heating process may be performed at about 700° C. for 1 hour.

Further embodiment of another aspect of the present disclosure may provide the high-entropy alloy superconductor wire materials made by the method for producing high-entropy alloy superconductor wire materials.

As said above, method for producing high-entropy alloy superconductor wire materials according to embodiments of present disclosure may determine the diameter and length of the wire during wire drawing through PIT process. Therefore, the diameter and length of the high-entropy alloy superconductor wire materials are not specifically limited. For example, the high-entropy alloy superconductor wire materials can have 1-mm diameter and tens to hundreds of meters in length.

The bulk high-entropy alloy superconductor having the above shape may be applied to various technologies including a method for producing a thin-film high-entropy alloy superconductor to be described below.

Figure 6:
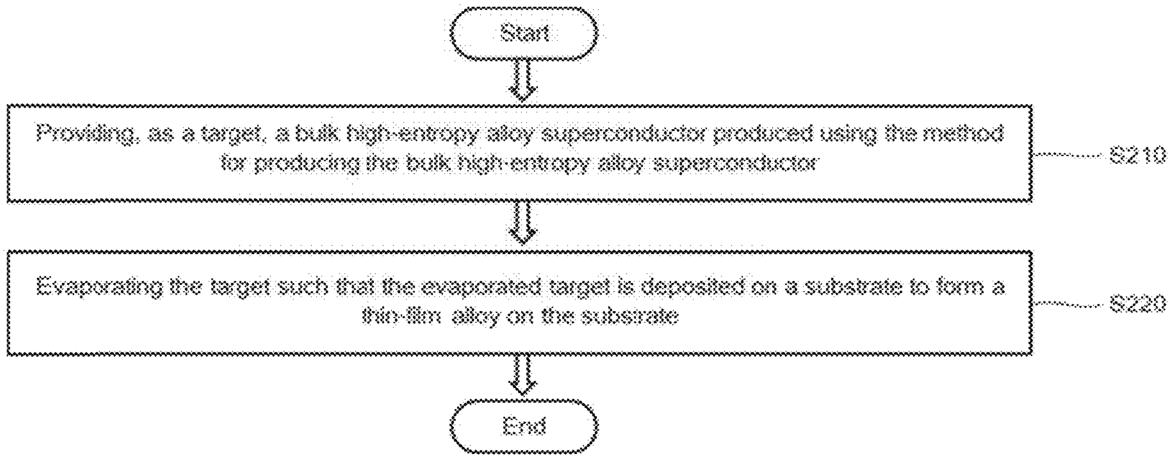
FIG. 6 is a flowchart illustrating a method for producing a thin-film high-entropy alloy superconductor according to an embodiment of the present disclosure.
Figure 7:
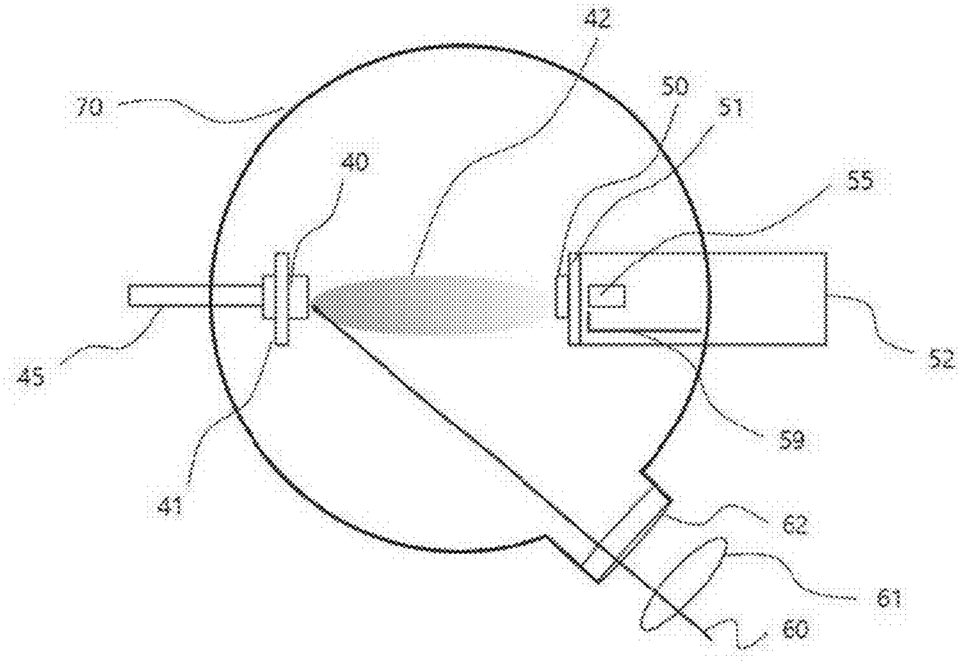
FIG. 7 is a view showing an apparatus for implementing a method for producing a thin-film high-entropy alloy superconductor according to an embodiment of the present disclosure.

FIG. 6 is a flowchart illustrating a method for producing a thin-film high-entropy alloy superconductor according to an embodiment of the present disclosure and FIG. 7 is a view showing a non-limiting example of an apparatus capable of implementing a method for producing a thin-film high-entropy alloy superconductor according to an embodiment of the present disclosure.

Referring to FIG. 6, a method for producing a thin-film high-entropy alloy superconductor according to an embodiment of the present disclosure may include a first step S210 of providing, as a target, a bulk high-entropy alloy superconductor; and a second step S220 of evaporating the target such that the evaporated target is deposited on a substrate to form a thin-film alloy on the substrate. In one embodiment, the target may be the bulk high-entropy alloy superconductor as produced by the method for producing the bulk high-entropy alloy superconductor according to an embodiment of the present disclosure as described above.

The thin-film high-entropy alloy superconductor produced by the method for producing the thin-film high-entropy alloy superconductor according to an embodiment of the present disclosure including the above steps has superconducting properties of the bulk high-entropy alloy superconductor, and may be produced as a thin-film.

In the context of the present disclosure, a target means a material that is subject to evaporation and deposition.

In one embodiment, the target includes niobium (Nb), tantalum (Ta), titanium (Ti), hafnium (Hf) and zirconium (Zr), and has a following Chemical Formula III:

[Chemical Formula III]

$$(Nb)_{z1}(Ta)_{z2}(Ti)_{z3}(Hf)_{z4}(Zr)_{z5}$$

where each of $z_1$ to $z_5$ is an integer greater than or equal to 1, and has a value of 5% to 35% of a total of $z_1$ to $z_5$.

In an embodiment, a molar ratio of Nb:Ta:Ti:Hf:Zr may be 2:1:1:1:1. That is, $z_1$ is 2, $z_2$ is 1, $z_3$ is 1, $z_4$ is 1, and $z_5$ is 1.

Based on the limitations of the types and the contents of the metals as described above, the thin-film high-entropy alloy superconductor according to an embodiment of the present disclosure may have excellent superconducting properties.

Referring to FIG. 7, the target 40 may be evaporated into an evaporated material 42. In one embodiment, the target 40 may be fixed to a target fixing plate 41.

The target 40 may be evaporated and deposited on the substrate 50. A scheme in which the target is evaporated is not particularly limited. In a non-limiting example, the target may be evaporated via irradiation of laser thereto.

In one embodiment, the target 40 may be evaporated via the irradiation of the laser thereto. A type of the laser is not particularly limited. In a non-limiting example, the laser may include pulse laser. In an embodiment, the pulse laser may be excimer pulse laser 60. In an embodiment, the excimer pulse laser 60 may be irradiated through a lens 61. In an embodiment, the excimer pulse laser 60 may be irradiated through a transmission window 62. The wavelength of the excimer pulse laser is not particularly limited. In an embodiment, the excimer pulse laser may have a wavelength of 193 to 532 nm. In one embodiment, a thickness of a finally formed thin-film high-entropy alloy superconductor may be adjusted by controlling the wavelength, an energy density, and the number of pulse waves of the excimer pulse laser 60.

In one embodiment, the target 40 may be evaporated while the target is rotating. Referring to FIG. 6, the target 40 may be fixed to the target fixing plate 41, and the target fixing plate 41 may be fastened to a rotating device 45 and may rotate along rotation of the rotating device 45.

In the context of the present disclosure, the substrate means a base on which a material of the target 40 is deposited. Referring to FIG. 6, while the substrate 50 is fastened to the substrate fixing plate 51, and is disposed in front of the target 40, the target material 42 into which the target 40 is evaporated may be deposited on the substrate 50. A type of the substrate 50 is not particularly limited. In one embodiment, the substrate may include a sapphire ($Al_2O_3$) single crystal or Hastelloy substrate. The sapphire single crystal or Hastelloy substrate has the advantage of reducing a cost of the process and using a material used in an existing process as it is.

In one embodiment, the substrate 50 may be heated to 270 to 620° C. A heating scheme is not particularly limited., A non-limiting example thereof may include a heating scheme using a halogen lamp. The halogen lamp enables fast heating and quick cooling. Referring to FIG. 6, in one embodiment, the substrate 50 may be heated using the halogen lamp 55. In one embodiment, in order to observe and control a heated state of the substrate 50, the apparatus may further include a thermoelectric module 59. Via the heating process as described above, the finally produced thin-film high-entropy alloy superconductor may maintain excellent superconducting properties during the deposition process.

In an embodiment, a distance between the target 40 and the substrate 50 may be adjusted. The adjustment scheme is not particularly limited. In one embodiment, spacing adjustment means 52 for adjusting the spacing between the target 40 and the substrate 50 may be further included in the apparatus. In one embodiment, the spacing adjustment means 52 may be of a screw type.

In an embodiment, the second step S220 may be performed in a vacuum of $10^{-7}$ to $10^{-5}$ Torr. Referring to FIG. 7, in an embodiment, the second step S220 may be performed in a high vacuum thin-film growth chamber 70. Maintaining the vacuum state as described above may allow oxidation of the metal to be prevented while the thin-film is deposited on the substrate.

The control of the scheme and the apparatus as described above may allow a thickness of the thin-film high-entropy alloy superconductor according to the embodiment of the present disclosure to be adjusted. In one embodiment, the thickness of the thin-film alloy may be in a range of 100 to 700 nm.

Hereinafter, Examples of the present disclosure will be described in detail. However, Examples as described below are only some embodiments of the present disclosure. The scope of the present disclosure is not limited to the following Examples.

[Example 1-1] Producing of Bulk High-Entropy Alloy Superconductor

Nb, Ta, Ti, Hf and Zr metals were mixed with each other in a molar ratio of 2:1:1:1:1 to prepare a metal mixture. The metal mixture was milled for 12 hours at 400 RPM at room temperature using a planetary ball mill. In order to prevent metal oxidation, the ball milling process was performed under an argon gas atmosphere. As a result, the mixed metal powders were produced.

The mixed metal powders were put into a circular carbon mold, and were sintered at a pressure of 50 MPa and a temperature of 700° C. for 1 hour. Thus, a bulk high-entropy alloy superconductor was produced.

[Example 1-2] Producing of Bulk High-Entropy Alloy Superconductor

A bulk high-entropy alloy superconductor was produced in the same manner as that in Example 1-1, except that the temperature of the sintering process was maintained at 800° C.

[Example 1-3] Producing Bulk High-Entropy Alloy Superconductor

A bulk high-entropy alloy superconductor was produced in the same manner as that in Example 1-1, except that the temperature of the sintering process was maintained at 900° C.

[Example 1-4] Producing Bulk High-Entropy Alloy Superconductor

A bulk high-entropy alloy superconductor was produced in the same manner as that in Example 1-1, except that the temperature of the sintering process was maintained at 1000° C.

[Example 1-5] Producing of Bulk High-Entropy Alloy Superconductor

A bulk high-entropy alloy superconductor was produced in the same manner as that in Example 1-1, except that the temperature of the sintering process was maintained at 1100° C.

[Example 2-1] Producing of Wire High-Entropy Alloy Superconductor

The mixed metal power according to the embodiment 1-1 is filled in a metal tube and is shaped in wire by PIT process in room temperature. Thus, a wire high-entropy alloy superconductor was produced.

[Example 2-2] Producing of Wire High-Entropy Alloy Superconductor

A wire high-entropy alloy superconductor was produced in the same manner as that in Example 2-1, except that the wire is sintered at 600° C. for 1 hour after deploying the wire into an electric furnace.

[Example 2-3] Producing of Wire High-Entropy Alloy Superconductor

A wire high-entropy alloy superconductor was produced in the same manner as that in Example 2-1, except that the wire is sintered at 700° C. for 1 hour after deploying the wire into an electric furnace.

[Example 2-4] Producing of Wire High-Entropy Alloy Superconductor

A wire high-entropy alloy superconductor was produced in the same manner as that in Example 2-1, except that the wire is sintered at 800° C. for 1 hour after deploying the wire into an electric furnace.

[Example 2-5] Producing of Wire High-Entropy Alloy Superconductor

A wire high-entropy alloy superconductor was produced in the same manner as that in Example 2-1, except that the wire is sintered at 900° C. for 1 hour after deploying the wire into an electric furnace.

[Example 2-6] Producing of Wire High-Entropy Alloy Superconductor

A wire high-entropy alloy superconductor was produced in the same manner as that in Example 2-1, except that the wire is sintered at 1000° C. for 1 hour after deploying the wire into an electric furnace.

[Example 3-1] Producing of Thin-Film High-Entropy Alloy Superconductor

The bulk high-entropy alloy superconductor according to Example 1-4 was provided as the target, which in turn was attached to the target fixing plate in the high-vacuum thin-film growth chamber. The sapphire single crystal substrate was provided and was attached to a substrate fixing plate in the high vacuum thin-film growth chamber.

The substrate was heated to 270° C. using a halogen lamp. The target was rotated using a rotating motor, and the target was evaporated by irradiating the excimer pulse laser thereto. During the evaporation of the target and the deposition of the evaporated target material onto the substrate, the high-vacuum thin-film growth chamber was maintained at a vacuum of 10-6 Torr. Thus, a thin-film high-entropy alloy superconductor was produced.

[Example 3-2] Producing of Thin-Film High-Entropy Alloy Superconductor

A thin-film high-entropy alloy superconductor was produced in the same manner as that in Example 3-1, except that a temperature of the substrate was set to 370° C.

[Example 3-3] Producing of Thin-Film High-Entropy Alloy Superconductor

A thin-film high-entropy alloy superconductor was produced in the same manner as that in Example 3-1, except that the temperature of the substrate was set to 470° C.

[Example 3-4] Producing of Thin-Film High-Entropy Alloy Superconductor

A thin-film high-entropy alloy superconductor was produced in the same manner as that in Example 3-1, except that the temperature of the substrate was set to 520° C.

[Example 3-5] Producing of Thin-Film High-Entropy Alloy Superconductor

A thin-film high-entropy alloy superconductor was produced in the same manner as that in Example 3-1, except that the substrate temperature was set to 570° C.

[Example 3-6] Producing of Thin-Film High-Entropy Alloy Superconductor

A thin-film high-entropy alloy superconductor was produced in the same manner as that in Example 3-1, except that the temperature of the substrate was set to 620° C.

[Example 4] Producing of Thin-Film High-Entropy Alloy Superconductor

A thin-film high-entropy alloy superconductor was produced in the same manner as that in Example 3-4, except that a Hastelloy substrate was used instead of the sapphire single crystal substrate.

Experimental Example 1

Figure 8:
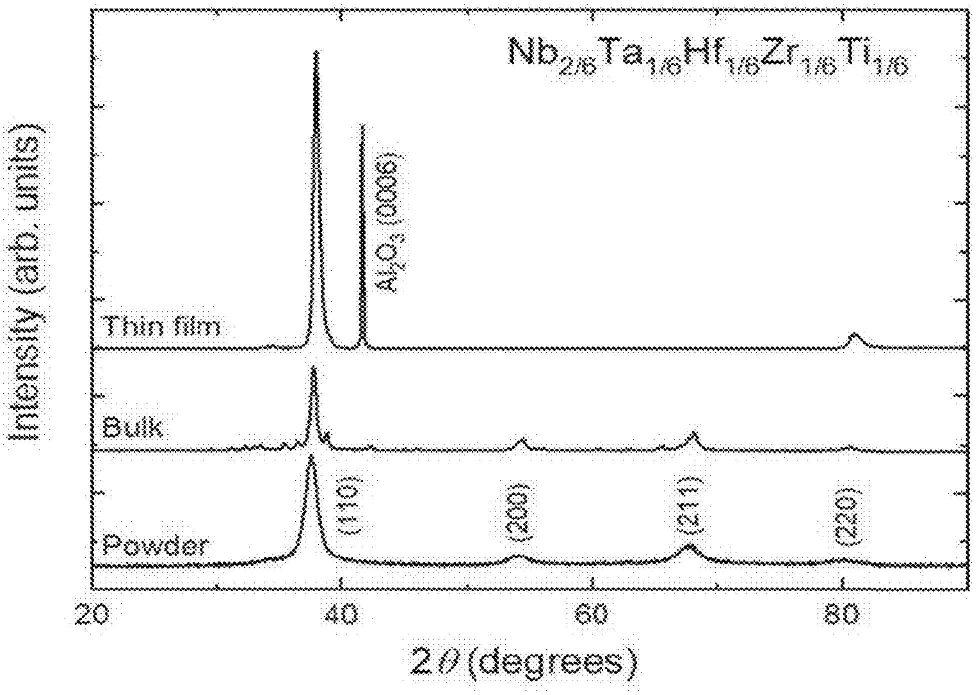
FIGS. 8 to 20 are diagrams showing results of testing a high-entropy alloy superconductor according to an embodiment of the present disclosure.

X-ray diffraction spectra of the metal powders and the bulk high-entropy alloy superconductor produced according to Example 1-4, and the thin-film high-entropy alloy superconductor produced according to Example 3-4 were observed. FIG. 8 is a diagram showing the results of the X-ray diffraction spectra. Referring to FIG. 8, it may be identified that each of the metal powders, and the bulk high-entropy alloy superconductor produced according to Example 1-4, and the thin-film high-entropy alloy superconductor produced according to Example 3-4 has a body-centered cubic (BCC) structure. In particular, it may be identified that the thin-film high-entropy alloy superconductor produced according to Example 3-4 is mainly grown in a (110) direction.

Experimental Example 2

Figure 9:
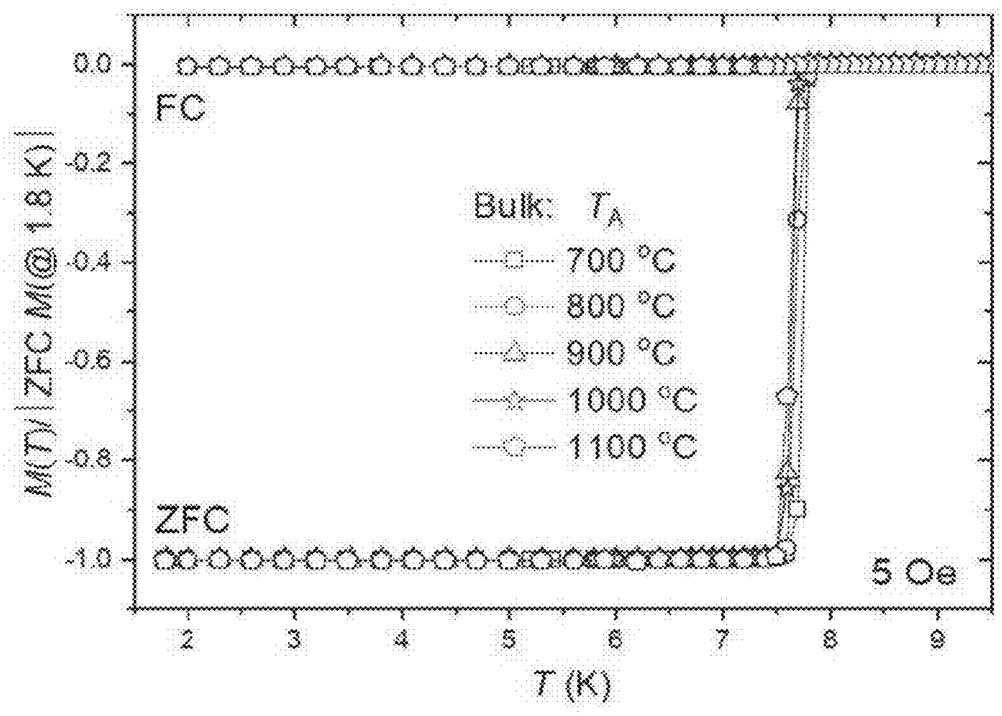

Magnetization based on a temperature which exhibits perfect diamagnetism of the bulk high-entropy alloy superconductor produced according to each of Examples 1-1 to 1-5 was measured and FIG. 9 is a diagram showing the result thereof.

Referring to a zero field cooling (ZFC) result of FIG. 9, it may be identified that the bulk high-entropy alloy superconductors according to Examples of the present disclosure have similar superconducting critical temperatures regardless of the sintering temperature and thus have excellent diamagnetic properties. Further, it may be identified that a superconducting phase transition appears abruptly near the critical temperature. This indicates that the sample has excellent homogeneity. For comparison, the magnetization value was normalized using an absolute value corresponding to 1.8 K in the ZFC of each sample.

Experimental Example 3

Figure 10:
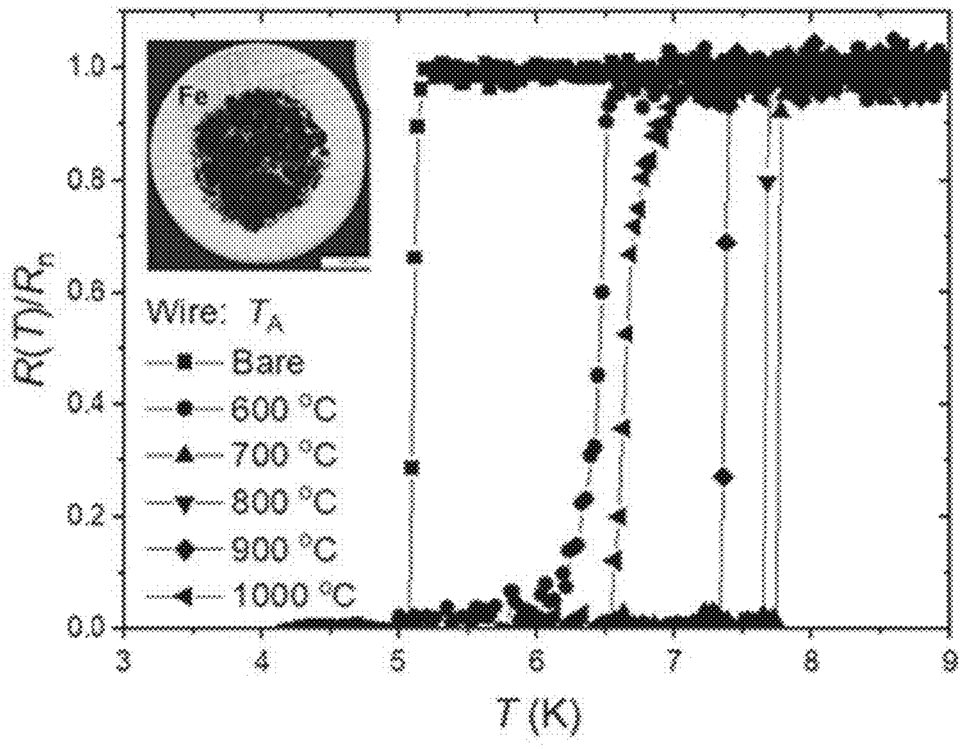

Resistance with respect to temperature of high-entropy alloy superconductor wire materials produced according to each of Example 2-1 to Example 2-6 which shows perfect conductivity is measured and FIG. 10 is a diagram showing the result thereof. The drawings of FIG. 10 is cross-sectional optical image of the wire materials.

Referring to FIG. 10, although the superconductivity critical temperature is affected by the sintering temperature of the manufactured wire, it can be confirmed that there is an abrupt superconducting transition in all the wires. For comparison, the resistance value was normalized using the resistance value (Rn) at the point where the superconducting phase transition starts in each sample.

Experimental Example 4

Figure 11:
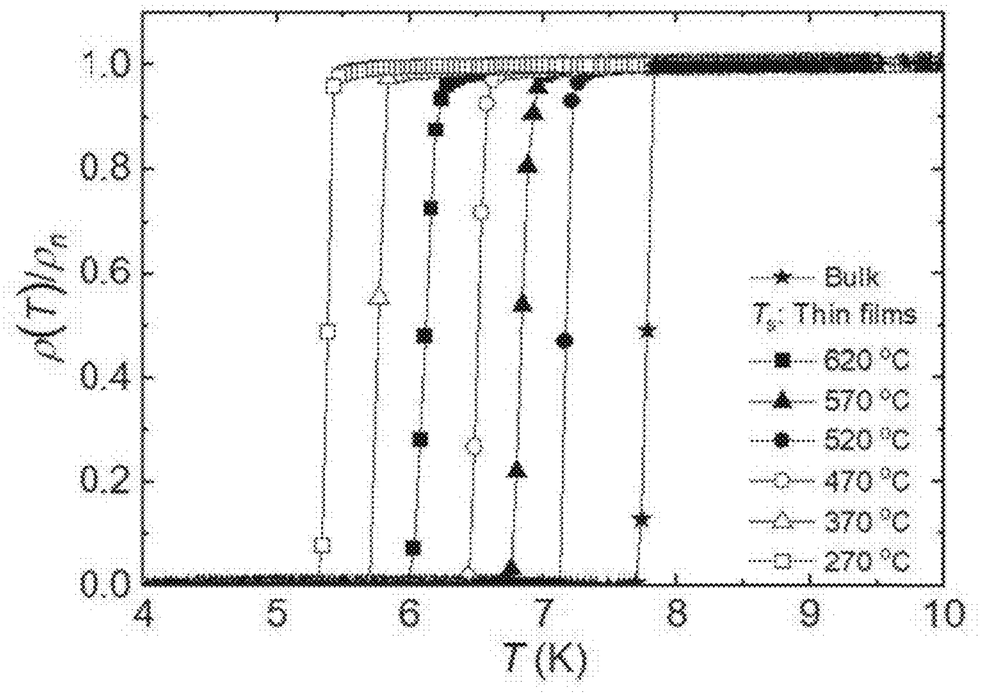

A specific resistance (resistivity) based on a temperature which exhibits perfect conductivity of each of the thin-film high-entropy alloy superconductor produced according to each of Example 3-1 to Example 3-6, and the bulk high-entropy alloy superconductor produced according to Examples 1~4 was measured and FIG. 11 is a diagram showing the result thereof.

Referring to FIG. 11, it may be identified that the superconducting critical temperature is affected by the temperature of the substrate used for the thin-film production, while there is an abrupt superconducting transition in all thin-films. For comparison, the resistivity value was normalized using a resistance value (Pn) at a point where the superconducting phase transition starts in each sample.

Experimental Example 5

Figure 12:
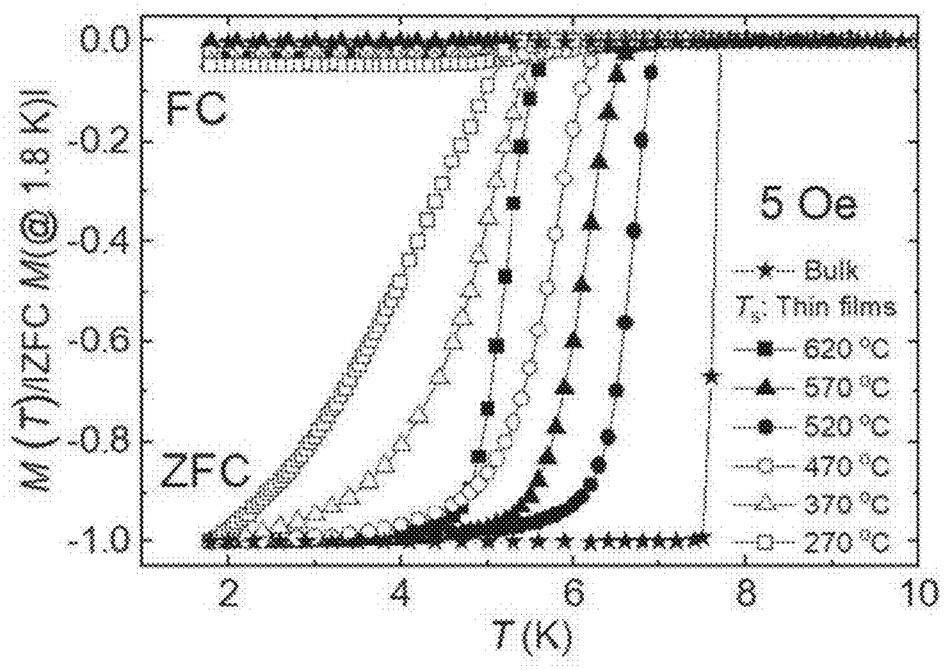

Magnetization based on a temperature which exhibits perfect diamagnetism of each of the bulk high-entropy alloy superconductor produced according to Example 1-4 and the thin-film high-entropy alloy superconductor produced according to each of Examples 3-1 to 3-6 was measured and FIG. 12 is a diagram showing the result thereof.

Referring to the ZFC results in FIG. 12, it may be identified that although the magnetization related to superconductivity is affected by the temperature of the substrate used for thin-film production, while all thin-films have excellent diamagnetic properties. For comparison, the magnetization value was normalized using the absolute value corresponding to 1.8 K in the ZFC of each sample.

Experimental Example 6

Figure 13:
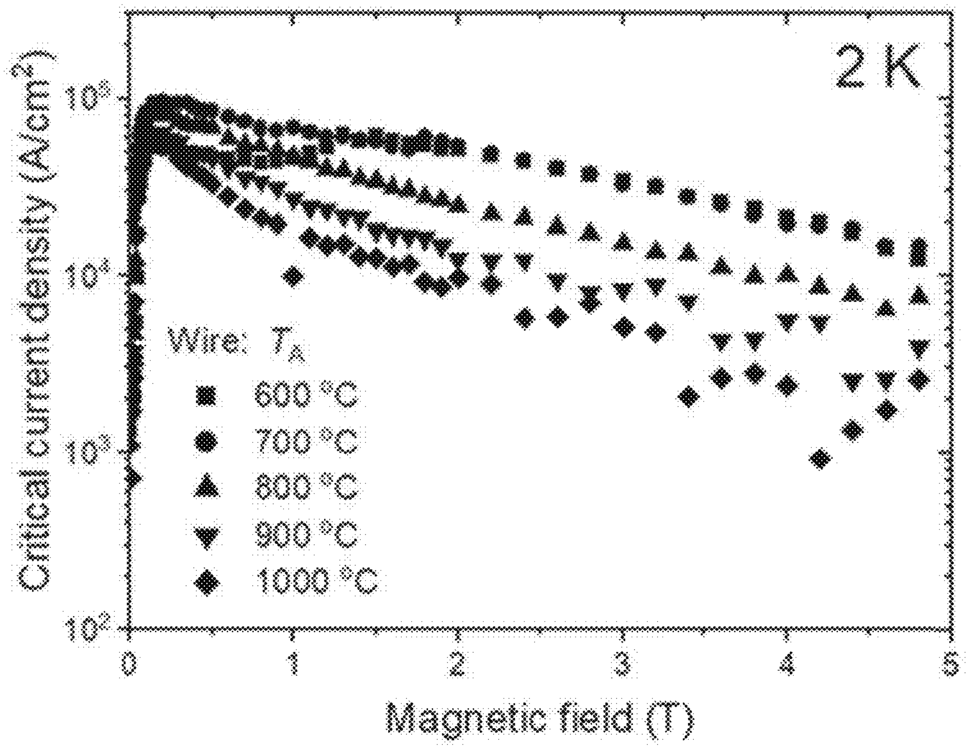
Figure 14:
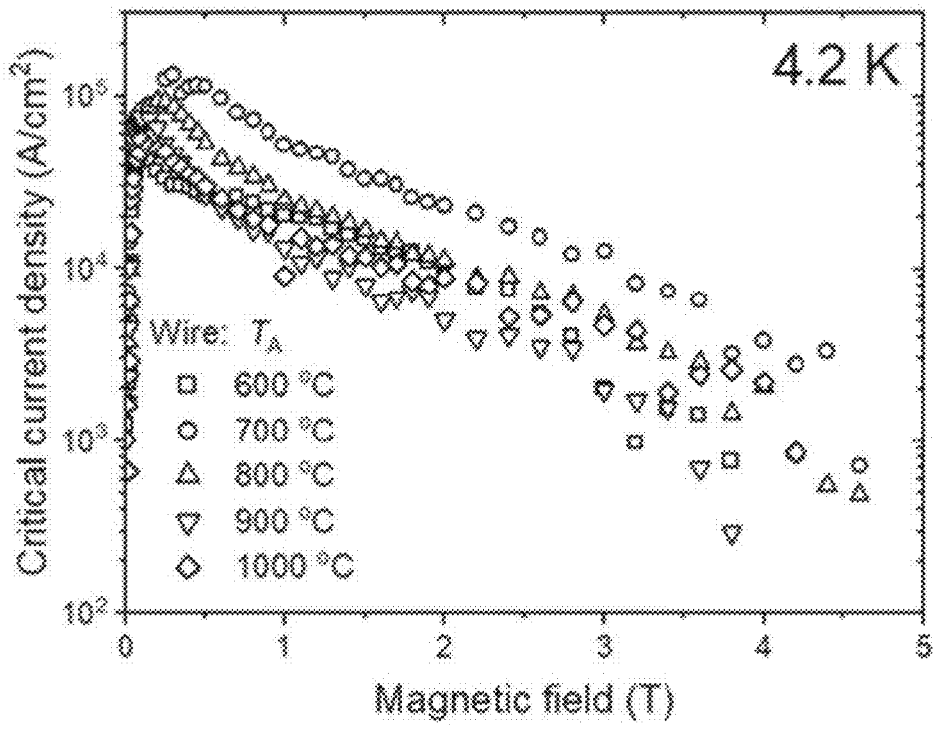

A magnetic field dependence of a critical current density value at temperatures 2 K and 4.2 K of each of the wire high-entropy alloy superconductor produced according to each of Examples 2-2 to 2-6 was measured and FIG. 13 shows the result thereof at the temperature 2 K, and FIG. 14 shows the result thereof at the temperature 4.2 K.

Experimental Example 7

Figure 15:
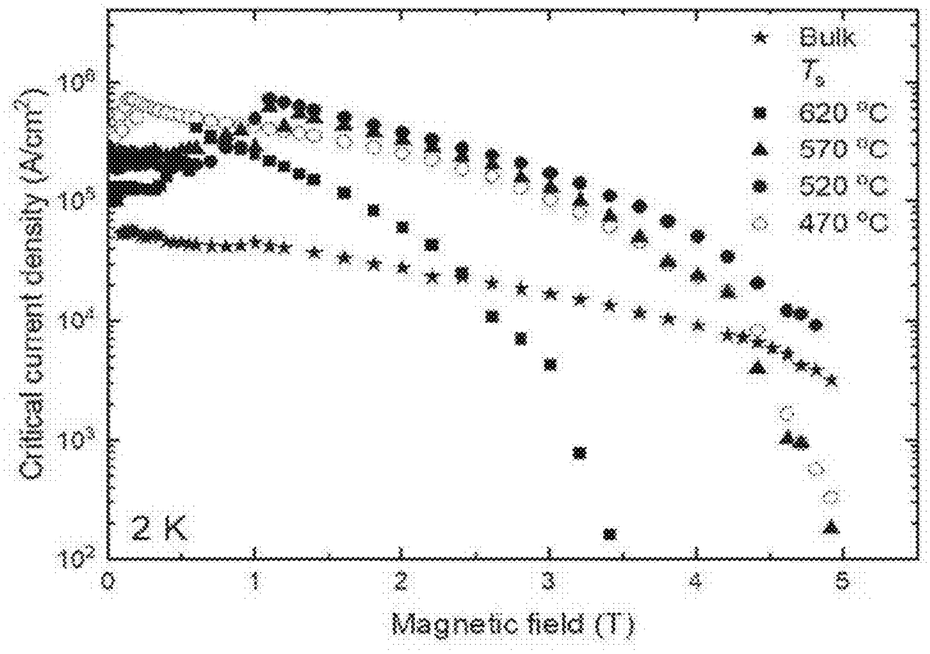
Figure 16:
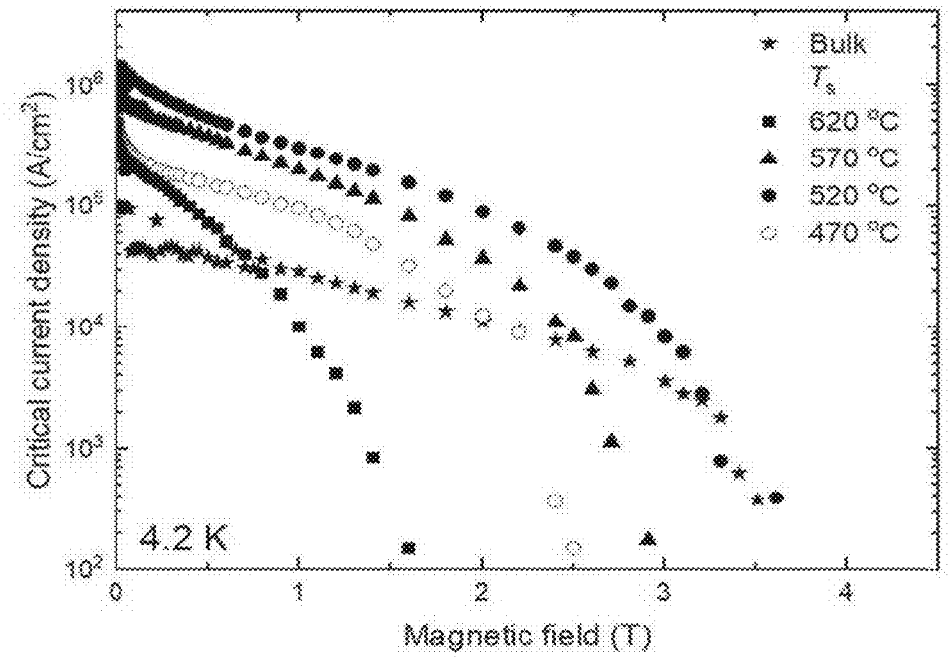
Figure 17:
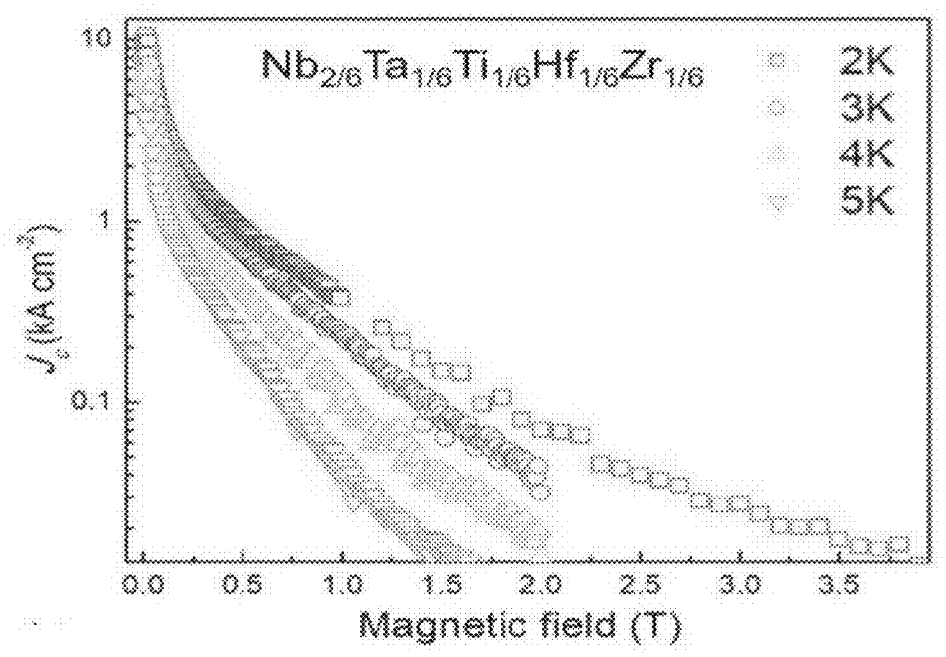
Figure 18:
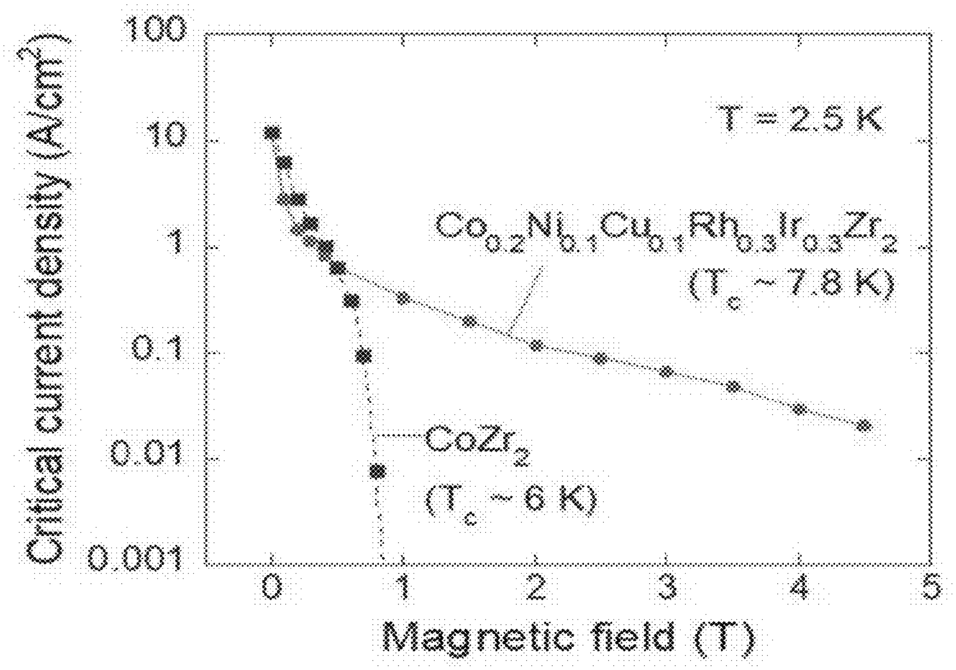

A magnetic field dependence of a critical current density value at temperatures 2 K and 4.2 K of each of the bulk high-entropy alloy superconductors produced according to Examples 3-3 to 3-6 was measured and FIG. 15 shows the result thereof at the temperature 2 K, and FIG. 16 shows the result thereof at the temperature 4.2 K. FIG. 17 shows the result of measuring a critical current density of a Nb—Ta—Ti—Hf—Zr based high-entropy alloy superconductor reported in G. Kim et al. Acta Materialia 186, 250256 (2020). FIG. 18 shows the result of measuring the magnetic field dependence of the critical current density value of a Co—Ni—Cu—Rh—Ir—Zr based high-entropy alloy superconductor reported in Y. Mizuguchi et al. arXiv:2009.07548.

Referring to FIG. 18, it may be identified that the superconducting critical temperature (superconducting transition temperature: Tc) of the Co—Ni—Cu—Rh—Ir—Zr based high-entropy alloy superconductor is 7.8 K, and is similar to the critical temperature of the high-entropy alloy superconductor but has a very small critical current density value of about 10 $A/cm^2$ at a magnetic field of 0 T.

Referring to FIGS. 15 to 18, it may be identified that the critical current density value of the bulk high-entropy alloy superconductor according to Example of the present disclosure is 10 times higher than that of the previously reported Nb—Ta—Ti—Hf—Zr based high-entropy alloy superconductor produced by an arc melting method at 0 T. Further, it may be identified that the magnetic field dependence of the critical current density of the bulk high-entropy alloy superconductor according to Example of the present disclosure is significantly improved.

Referring to FIGS. 15 and 17, it may be identified that the thin-film high-entropy alloy superconductor according to Example 3-4 of the present disclosure has a critical current density value 10 times higher than that of the bulk high-entropy alloy superconductor according to Example 1-4. In addition, it may be identified that the critical current density value of the thin-film high-entropy alloy superconductor according to Example 2-4 of the present disclosure is 100 times higher than the critical current density value of the Nb—Ta—Ti—Hf—Zr based high-entropy alloy superconductor as shown in FIG. 13. It may be identified that the magnetic field dependence of the critical current density of the thin-film high-entropy alloy superconductor according to Example 2-4 of the present disclosure also exhibits exceptionally good characteristics.

Experimental Example 8

Figure 19:
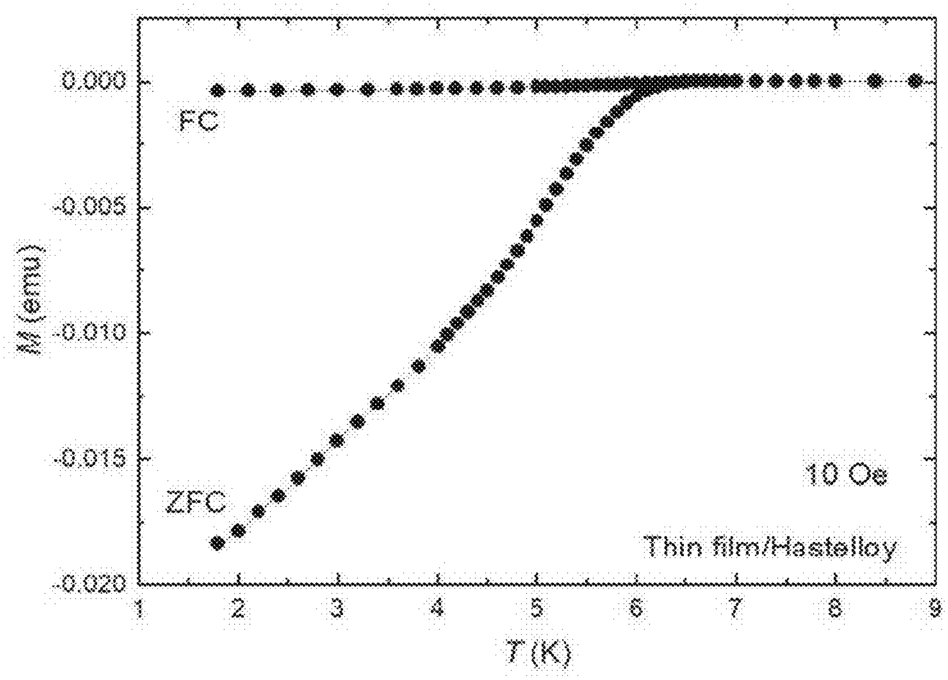

Magnetization based on a temperature exhibiting perfect diamagnetism of the thin-film high-entropy alloy superconductor according to Example 4 was measured and FIG. 19 is a diagram showing the result thereof.

Referring to the ZFC result in FIG. 19, it may be identified that the thin-film high-entropy alloy superconductor produced on the Hastelloy substrate has excellent diamagnetic properties.

Experimental Example 9

Figure 20:
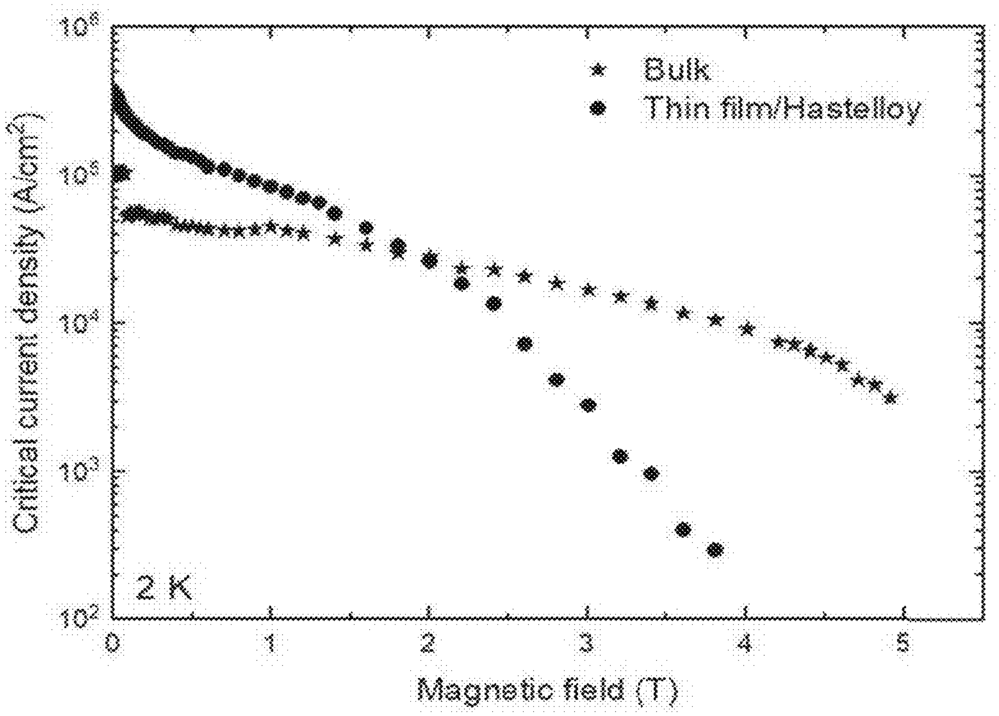

The magnetic field dependence of the critical current density value at a temperature of 2 K of each of the bulk high-entropy alloy superconductor according to Example 1-4 and the thin-film high-entropy alloy superconductor according to Example 4 was measured and FIG. 20 is a diagram showing a result thereof.

Referring to FIG. 20, it may be identified that the thin-film high-entropy alloy superconductor according to Example 4 does not have excellent magnetic field dependence of the critical current density compared to that of the bulk high-entropy alloy superconductor according to Example 1-4, whereas the thin-film high-entropy alloy superconductor according to Example 3 has superior critical current density characteristics to that of the bulk high-entropy alloy superconductor according to Example 1-4 at magnetic fields lower than 0 T and 2 T.

Although the present disclosure has been described above with reference to the Examples of the present disclosure, those skilled in the art may variously modify and change the present disclosure without departing from the spirit and scope of the present disclosure as described in the claims below.

What is claimed is:

1. A method for producing a bulk high-entropy alloy superconductor, the method comprising:

a first step of mixing to 10 types of metals selected from a group consisting of niobium (Nb), tantalum (Ta), titanium (Ti), hafnium (Hf), zirconium (Zr), tungsten (W), molybdenum (Mo), chromium (Cr), vanadium (V), and rhenium (Re) with each other to prepare a mixture, and then milling the mixture to prepare mixed metal powders according to a following Chemical Formula I; and a second step of sintering the mixed metal powders prepared in the first step:

$$(M_1)_{x1}(M_2)_{x2}(M_3)_{x3} \ldots (M_n)_{xn} \quad \text{(I)}$$

where n is an integer from 4 to 10, $M_1$ to $M_n$ respectively represent the 4 to 10 types of the metals selected from the group consisting of niobium (Nb), tantalum (Ta), titanium (Ti), hafnium (Hf), zirconium (Zr), tungsten (W), molybdenum (Mo), chromium (Cr), vanadium (V), and rhenium (Re), each of $x_1$ to $x_n$ is an integer greater than or equal to 1, and has a value of 5% to 35% of a total of $x_1$ to $x_n$- wherein the 4 to 10 types of the metals in the first step include niobium (Nb), tantalum (Ta), titanium (Ti), hafnium (Hf) and zirconium (Zr), wherein the alloy produced in the second step has a following Chemical Formula II:

$$(Nb)_{y1}(Ta)_{y2}(Ti)_{y3}(Hf)_{y4}(Zr)_{y5} \quad (II)$$

wherein $y_1$ is 2, $y_2$ is 1, $y_3$ is 1, $y_4$ is 1, and $y_5$ is 1.

2. The method of claim 1, wherein the milling in the first step includes ball milling.

3. The method of claim 2, wherein the ball milling is performed for about 9 to 24 hours at about 200 to 600 RPM.

4. The method of claim 2, wherein the ball milling is performed under an argon gas atmosphere.

5. The method of claim 1, wherein the sintering in the second step includes placing the mixed metal powders in a mold, applying pressure to the mixed metal powders in the mold, heating the mixed metal powders in the mold, and maintaining the mixed metal powders under the applied pressure and temperature.

6. The method of claim 5, wherein the mold includes a carbon mold.

7. The method of claim 5, wherein the pressure is about 5 to 500 MPa, the temperature is about 500 to 1300° C., and the mixed metal powders are maintained under the applied pressure and temperature for about 5 minutes to 2 hours.

* * * * *